United States Patent [19]

Bartylla

[11] Patent Number: 4,470,638
[45] Date of Patent: Sep. 11, 1984

[54] HUBCAP ATTACHMENT

[75] Inventor: Thomas Bartylla, White Bear Lake, Minn.

[73] Assignee: Bartco Industries, Inc., White Bear Lake, Minn.

[21] Appl. No.: 431,845

[22] Filed: Sep. 30, 1982

[51] Int. Cl.³ .................................................. B60B 7/06
[52] U.S. Cl. .............................. 301/37 CD; 301/37 S; 301/108 S; 301/108 R
[58] Field of Search ............. 301/37 P, 37 CD, 37 C, 301/108 R, 108 A, 37 S, 108 S

[56] References Cited

U.S. PATENT DOCUMENTS

| | | |
|---|---|---|
| 1,492,245 | 4/1924 | Ferris ............................. 301/108 R |
| 1,979,895 | 11/1934 | Maker . |
| 2,023,674 | 12/1935 | Fawick . |
| 2,034,464 | 3/1936 | Fergueson et al. . |
| 2,818,304 | 12/1957 | Horn ............................. 301/108 R |
| 3,092,420 | 6/1963 | Baldwin et al. . |
| 3,149,883 | 9/1964 | Reilly ............................. 301/108 A |
| 3,288,488 | 11/1966 | Shinn . |
| 4,123,111 | 10/1978 | Renz et al. . |
| 4,167,294 | 9/1979 | Okasaki et al. . |
| 4,183,587 | 1/1980 | Spisak . |

Primary Examiner—David A. Scherbel
Attorney, Agent, or Firm—Haller, James R.

[57] ABSTRACT

A hubcap attachment for attaching a hubcap to the axle hub of a vehicle. The attachment comprises a generally circular, rigid base plate, flexible hubcap retaining means carried by the base plate at its periphery for releasably but firmly mounting the hubcap to the base plate, and adjustable hub attachment means. The latter means comprises a generally circular belt tightenable about the circumference of an axle hub. Attachment means are provided to mount the belt generally concentrically of the base plate.

7 Claims, 4 Drawing Figures

U.S. Patent  Sep. 11, 1984  4,470,638
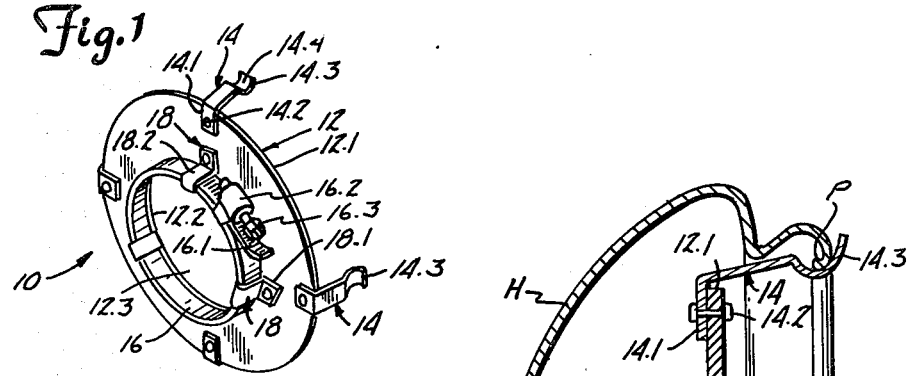
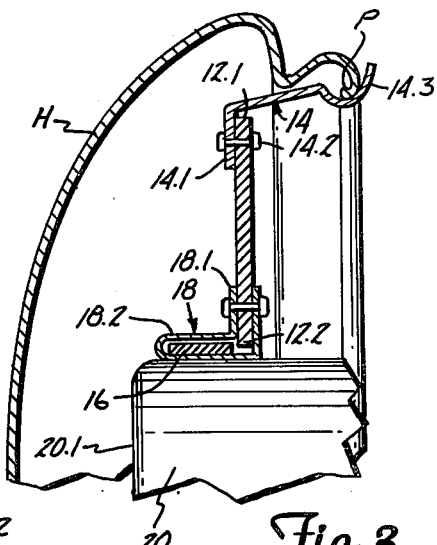
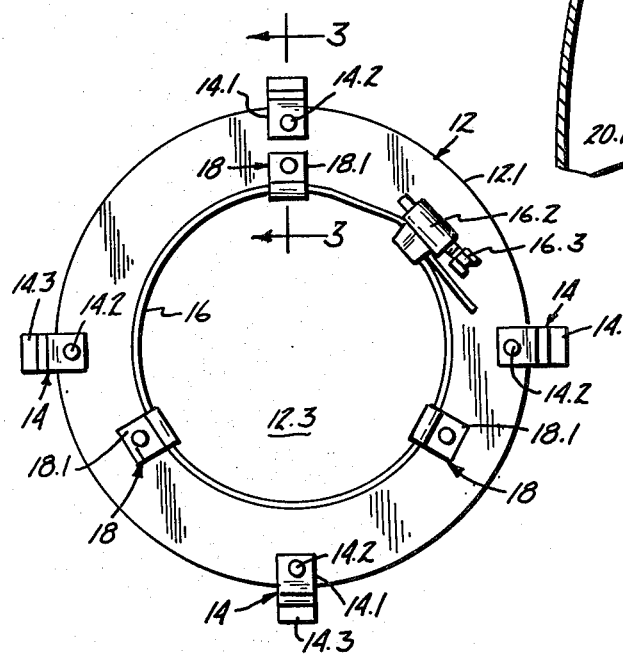
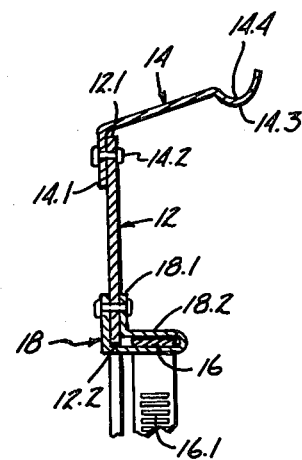

HUBCAP ATTACHMENT

TECHNICAL FIELD

The invention relates to connectors particularly used for connecting hubcaps to the axle covers of vehicles.

BACKGROUND ART

In the over-the-road trucking industry, it has been commom for truck drivers to install decorative hubcaps on the drive wheels and front wheels of tractor units. The hubcaps ordinarily used on the tractor wheels are of a dished shape, and frequently are referred to as "moons". The axle covers, or wheel faces, for these wheels are readily accessible and accordingly hubcaps can easily be fitted to these wheels. The rear wheels of a trailer adapted to be drawn by a tractor, however, present a different situation. The axle covers for such wheels are recessed far within the wheel wells themselves, rendering the attachment of hubcaps difficult. Asthetically, the hubcaps should be positioned adjacent the outer edges of the wheels, should be securely held, but should be readily removable so that access may be had to the axle covers for servicing.

Various devices have been used to connect hubcaps to wheels, and illustrative of these are the devices shown in U.S. Pat. Nos. 1,979,895, 3,092,420, 3,288,488, 4,123,111, 4,167,294, and 4,183,587.

DISCLOSURE OF INVENTION

The instant invention provides a connector for releasably but firmly attaching a hubcap to the axle hub of a vehicle. "Axle hub" refers to that end portion of the axle that projects outwardly beyond the attachment of a wheel to an axle. The connector comprises a generally circular, rigid base plate and a flexible, hubcap-retaining means carried by the base plate at its periphery for releasably but firmly mounting a hubcap to the base plate. The attachment includes adjustable hub attachment means comprising a generally circular belt tightenable about the circumference of an axle hub, and attachment means mounting the belt generally concentrically of the base plate and spaced inwardly of the outer periphery of the base plate.

In a preferred embodiment, the base plate is formed with a central aperture through which the end of an axle hub may extend and wherein the attachment means for mounting the belt to the base plate comprises a plurality of flexible brackets mounted concentrically to the base plate but spaced inwardly from its outer periphery, each bracket having a belt, supporting portion extending generally axially from the base plate and bendable, when the belt is tightened, to permit the belt to firmly engage the outer circumference of the axle hub.

BRIEF DESCRIPTION OF THE DRAWING

FIG. 1 is a perspective view of a hubcap attachment of the invention;

FIG. 2 is a plan view of the hubcap attachment of FIG. 1;

FIG. 3 is a broken-away, cross sectional view taken along line 3—3 of FIG. 2 and showing a portion of a hubcap and axle hub; and FIG. 4 is a very similar view to that of FIG. 3 but showing a modified embodiment.

BEST MODE FOR CARRYING OUT THE INVENTION

Referring now to FIG. 1, an attachment of the invention is designated generally as (10) and includes a generally circular base plate (12), the outer periphery (12.1) of which desirably is slightly less than the inner rim periphery of a hubcap to be attached to the axle hub of a vehicle. A plurality of spring-loaded fingers (14), typifying the flexible, hubcap-retaining means, are carried by the base plate at its periphery. As shown in the drawing, the flexible fingers (14) may be of spring steel or other springy material, and each may have a flattened end portion (14.1) riveted (as at 14.2) or bolted or otherwise attached to the peripheral portion of the base plate, each finger extending preferably over the peripheral edge of the base plate and extending from the base plate in a direction generally parallel to and preferably slightly divergent from the axis of the base plate (12). At its free end (14.3), each springy finger (14) is provided with an outwardly concave bend forming a recess (14.4) (best shown in FIG. 4) for capturing an inwardly turned rim portion P of a hubcap ("H" in FIG. 3). The fingers (14) preferably are arranged equiangularly about the periphery of the base plate (12). At least three fingers, and preferably four fingers as depicted, are employed.

A tightenable belt (16), which can be adjusted to the diameter of an axle hub and tightened on the hub circumference, is mounted to the base plate (12) by means of a plurality of brackets (18), the latter typifying attachment means. The belt desirably is made of steel, and may take the form of a commonly known hose clamp; that is, the belt (16) may be provided with a series of slots (18.1) adjacent one end and may be provided with an adjustable fastener (18.2) of known design at its other end, the fastener including a slot which receives the first end and which includes a threaded shank, the threads of which engage the slots (16.1) in the free end of the belt. As is common, the shank includes an outwardly extending end (16.3) appropriately slotted to receive a screwdriver or the like. As the end (16.3) is turned, the free end of the belt is drawn through the fastener (16.2) in one direction or the other, all as is known.

The brackets (18) desirably each are formed of a single length of metal strapping that is doubled back upon itself to form an elongated recess for loosely receiving the belt (16), as shown best in FIG. 3. The ends of each length of strapping are bent parallel to one another and contact the peripheral surfaces of the base plate (12) adjacent the rim (12.2) (FIG. 3) of a circular aperture (12.3) preferably formed centrally through the thickness of the base plate (12). The portions (18.2) of the brackets (18) forming the recess in which is positioned the belt (16) preferably are springy and flexible and are capable of being bent inwardly as the belt is tightened. The brackets (18) thus are positioned adjacent the circular rim (12.2) of the aperture (12.3), the belt (16) thus being held in a generally circular configuration and with a diameter approximately the same as the diameter of the aperture (12.3). Although any convenient number of brackets (18) may be employed, it is preferred that at least three such brackets be employed, as shown in the drawing. The belt (16), as depicted, is positioned slightly to one side or the other, but in a plane parallel to, the plane of the base plate (12). In the embodiment shown in FIGS. 1-3, inclusive, the brackets (18) extend on one side of the plane of the base plate (12), whereas the FIG. 14 extend to the other side of the plane of the base plate. In FIG. 4, both the brackets (18) and the fingers (14) extend to the same side of the base plate (12). The embodiments of FIGS. 1–3 is preferred, since this embodiment provides ready access to the belt to tighten or loosen the same.

In use, a hubcap attachment of the invention is first attached to an axle hub by placing the belt (16) over the end of the hub and tightening the belt until it securely engages the outer circumference of the hub, care being taken to maintain the plane of the base plate (12) perpendicular to the access of the hub (20) (FIG. 3). As so mounted, the fingers (14) extend generally away from the hub end (20.1). A hubcap H, of known design, is then passed about the base plate (12) as shown in FIG. 3 and the inwardly turned mounting rim P of the hubcap slides along the length of the finger (14) and comes to rest securely in the recess (14.4). As the hubcap is forced over the fingers (14), it will be understood that the fingers are deformed resiliently inwardly slightly and then snapped back into the position shown in FIG. 3 once the rim "P" is captured within the recess (14.4) of the fingers. As installed, the hubcap itself completely covers the axle hub (20) and substantially the entire attachment (10), thus providing a smooth, clean appearance.

While a preferred embodiment of the present invention has been described, it should be understood that various changes, adaptations and modifications may be made therein without departing from the spirit of the invention and the scope of the appended claims.

What is claimed is:

1. A hubcap attachment for attaching a hubcap to the axle hub of a vehicle, comprising a generally circular, rigid base plate, flexible hubcap retaining means carried by the base plate at its periphery for releaseably but firmly mounting a hubcap to the base plate, adjustable hub attachment means comprising a generally circular belt tightenable about the circumference of an axle hub, and attachment means mounting the belt generally concentrically of the base plate and spaced inwardly of the outer periphery of the base plate, the attachment means including a belt-supporting portion extending generally axially from the base plate and bendable, when the belt is tightened, to permit the belt to firmly engage the outer circumference of an axle hub.

2. The attachment of claim 1 wherein the base plate is formed with a central aperture through which the end of an axle hub may extend.

3. The attachment of claim 1 wherein said attachment means comprises a plurality of flexible brackets mounted concentrically to the base plate but spaced inwardly from its outer periphery.

4. The attachment of claim 1 in which the belt comprises a metal strap laying in a plane parallel to the plane of the mounting plate.

5. The attachment means of claims 1, 2, 3, or 4 in which the hubcap retaining means comprises a plurality of springy metal fingers arranged about and carried by the periphery of the mounting plate, each finger having a leg portion extending from the base plate and terminating in an outwardly concave portion forming a recess for receiving an inwardly-projecting mounting rim of a hubcap.

6. A hubcap attachment for attaching a hubcap to the axle hub of a vehicle, comprising a generally circular, rigid base plate having a central aperture therein defining an inner concentric rim, hubcap retaining means comprising a plurality of springy metal fingers arranged about and carried by the outer periphery of the mounting plate, each finger having a leg portion terminating in an outwardly concave portion forming a recess for receiving an inwardly projecting mounting rim of a hubcap, a generally circular metal belt tightenable about the circumference of an axle hub, and attachment means mounting the belt generally concentrically of the base plate and comprising a plurality of flexible brackets carried concentrically of the base plate adjacent its inner rim, each bracket having a belt-supporting portion extending generally axially from the base plate and resiliently bendable, when the belt is tightened, to permit the belt to firmly engage the outer circumference of an axle hub.

7. A hubcap attachment for attaching a hubcap to the axle hub of a vehicle, comprising a generally circular rigid base plate, hubcap retaining means carried by the base plate at its periphery for releaseably but firmly mounting a hubcap to the base plate, and adjustable hub attachment means for mounting the hubcap attachment to the axle hub of a vehicle comprising a generally circular belt tightenable about the circumference of an axle hub, and belt attachment means mounting the belt concentrically of the base plate and spaced inwardly of the outer periphery of the base plate, the attachment means comprising a plurality of flexible brackets carried concentrically of the base plate but spaced inwardly from its outer periphery, each bracket having a belt-supporting portion extending generally axially from the base plate and bendable, when the belt is tightened, to permit the belt to firmly engage the outer circumference of an axle hub.

* * * * *